April 24, 1934.　　　J. C. WILKIE ET AL　　　1,955,867
TOASTING AND COOKING APPARATUS
Filed April 10, 1929　　　4 Sheets-Sheet 1
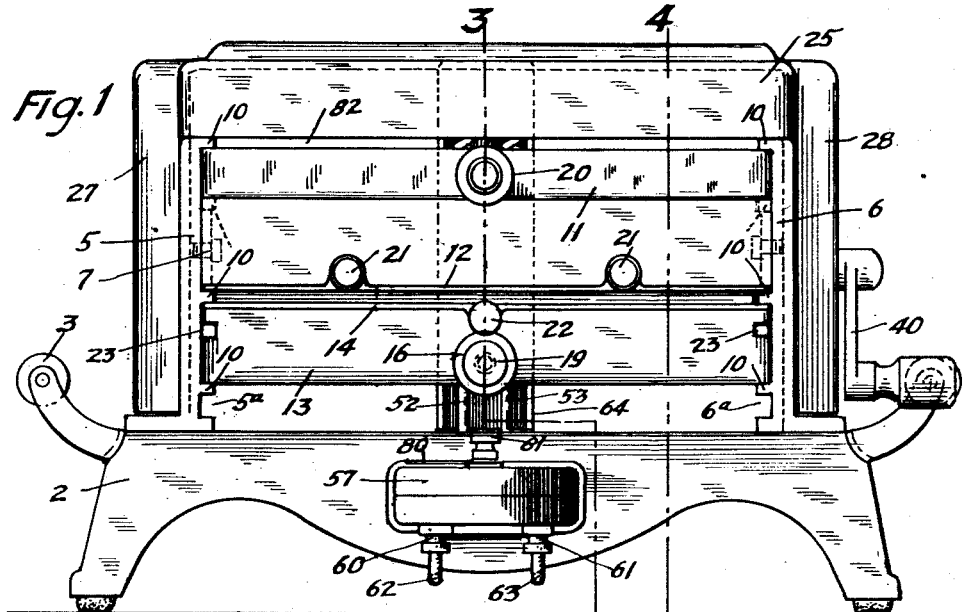
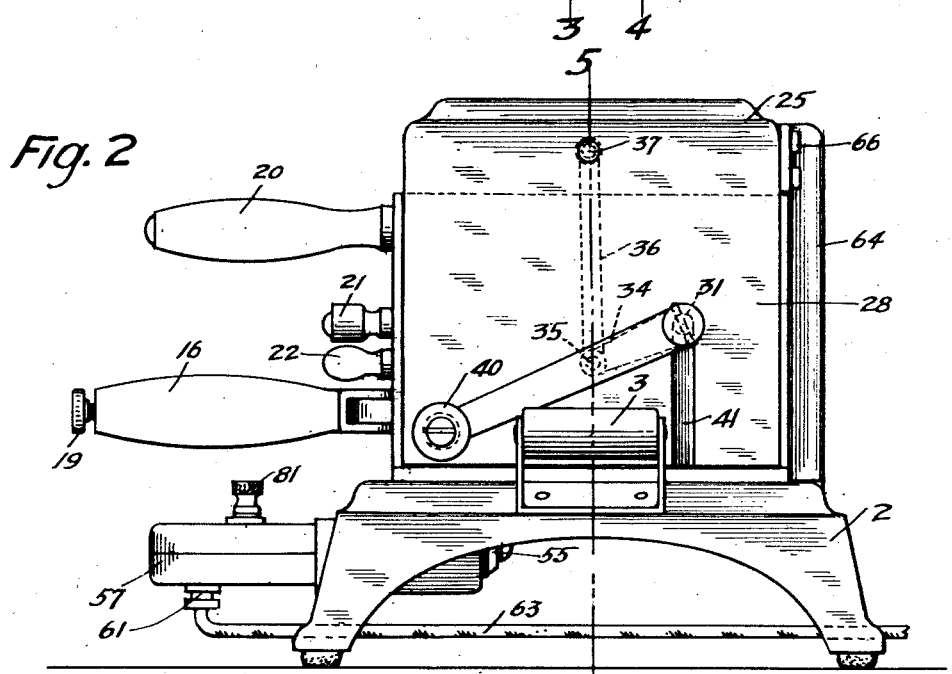
Inventors
Julius C. Wilkie.
Nathan R. T. McLean.
By
Their Attorneys.

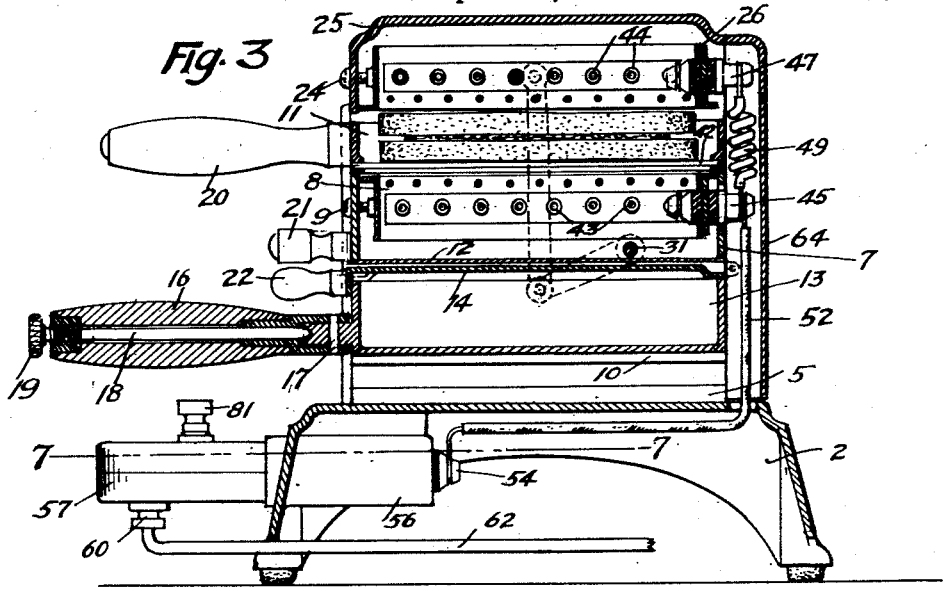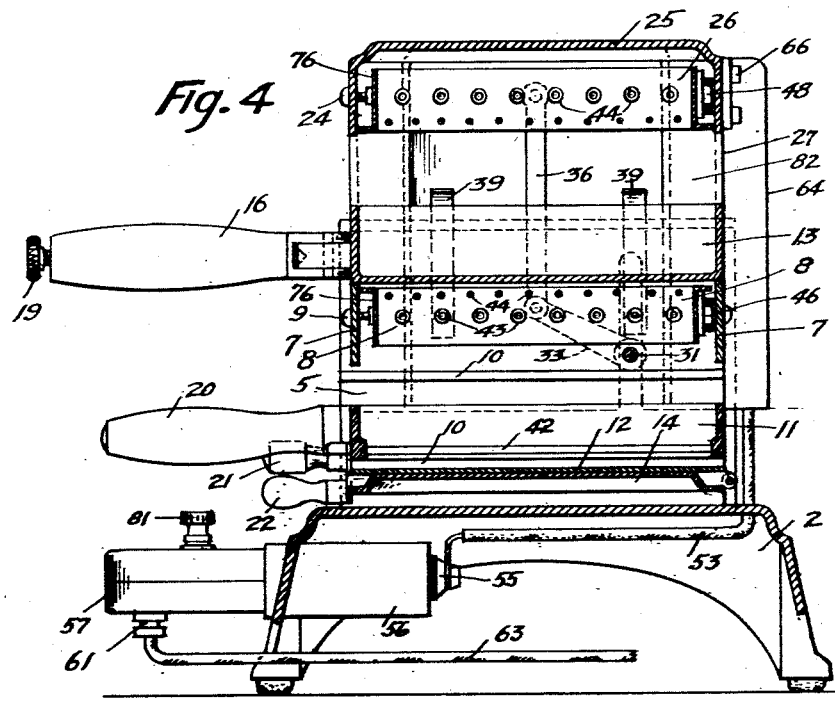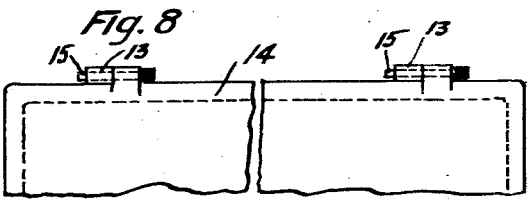

April 24, 1934. J. C. WILKIE ET AL 1,955,867
TOASTING AND COOKING APPARATUS
Filed April 10, 1929 4 Sheets-Sheet 3
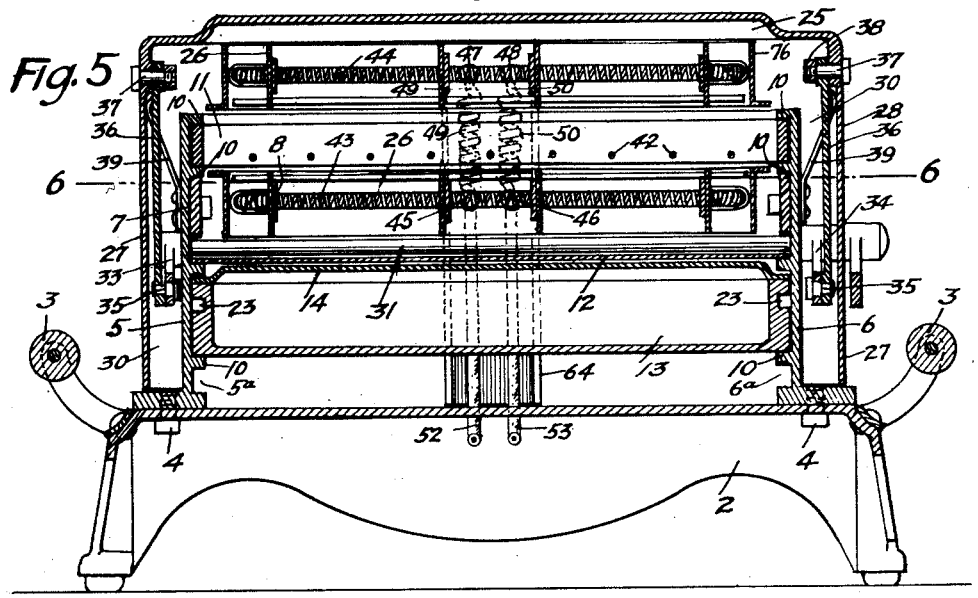
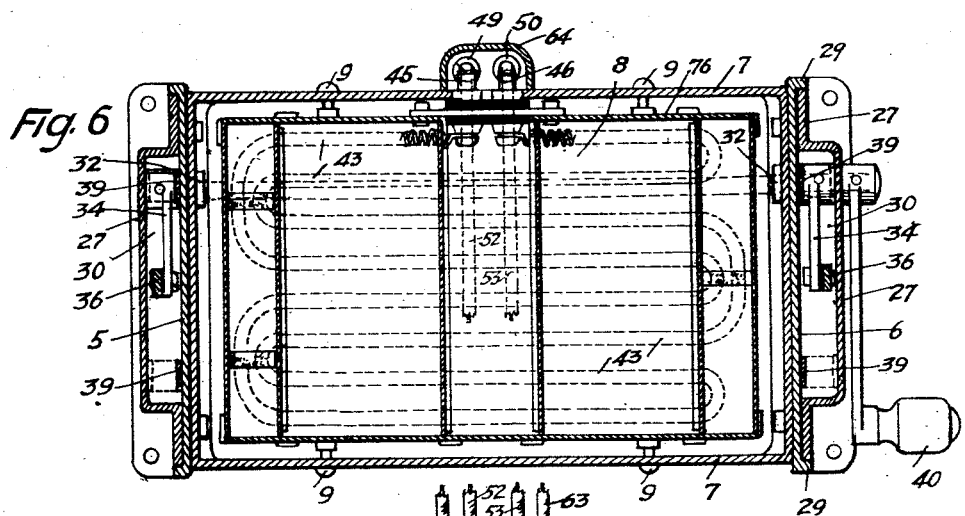
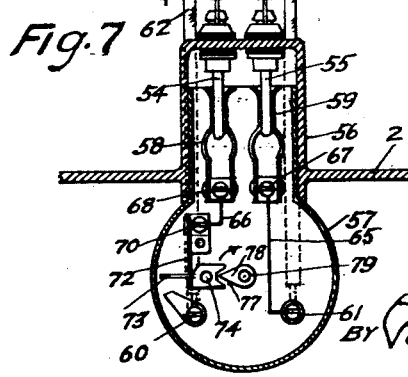
Inventors.
Julius C. Wilkie
Nathan R. T. McLean
Their Attorneys.

April 24, 1934.  J. C. WILKIE ET AL  1,955,867
TOASTING AND COOKING APPARATUS
Filed April 10, 1929  4 Sheets-Sheet 4
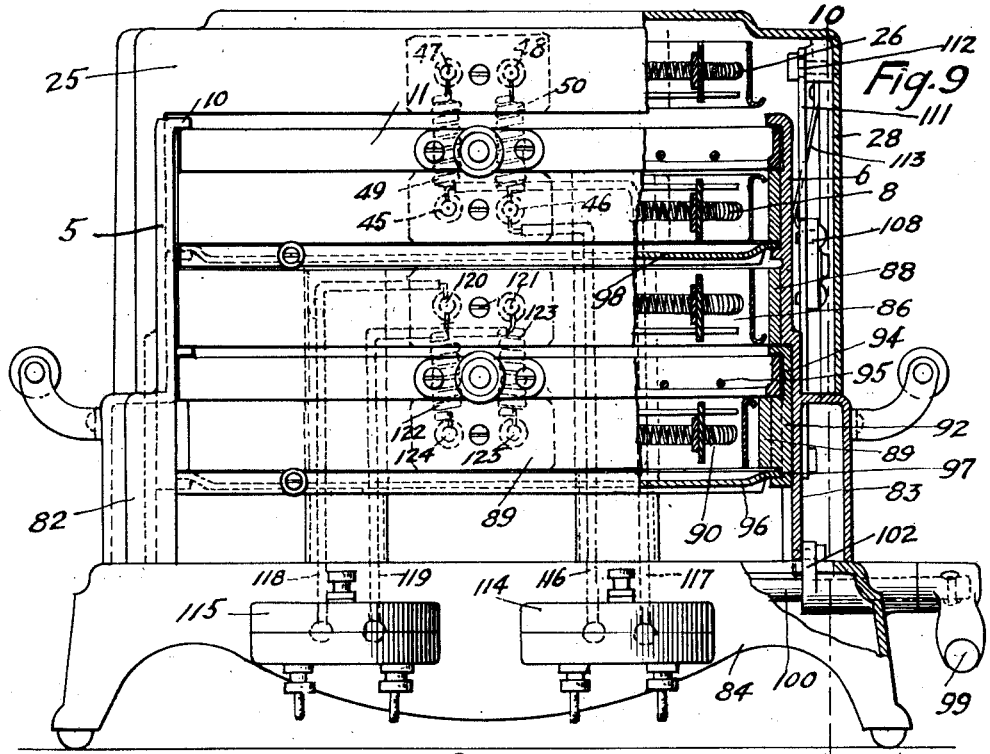
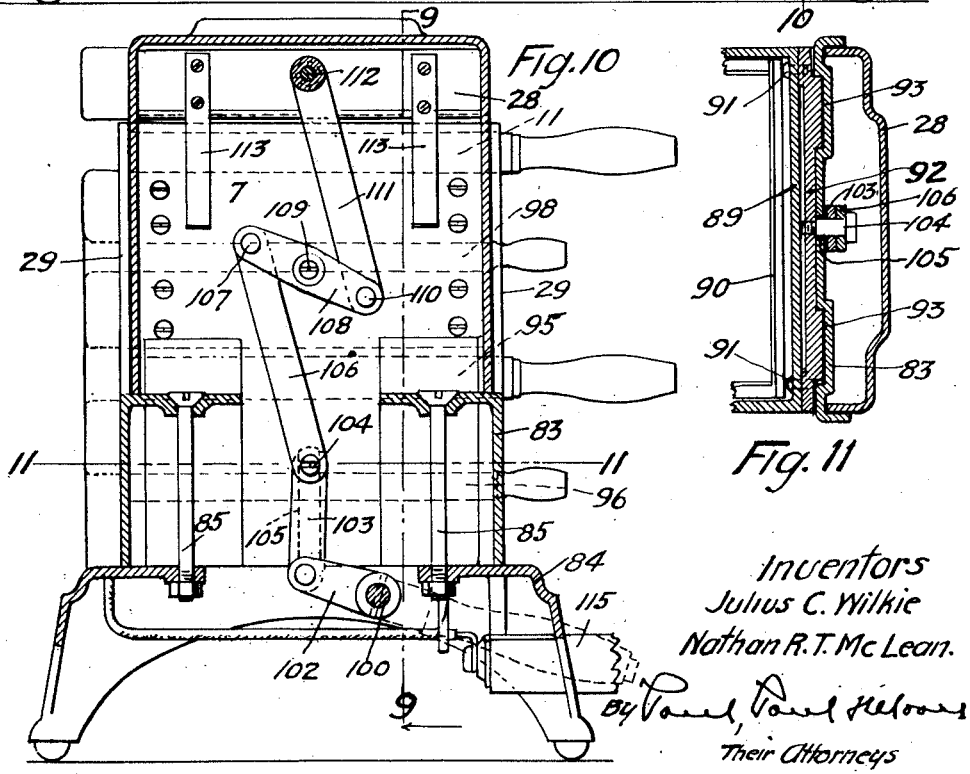
Inventors
Julius C. Wilkie
Nathan R. T. McLean.
Their Attorneys Patented Apr. 24, 1934

1,955,867

UNITED STATES PATENT OFFICE 1,955,867

TOASTING AND COOKING APPARATUS

Julius C. Wilkie and Nathan R. T. McLean, Minneapolis, Minn., assignors, by direct and mesne assignments, to Northern States Mfg. Co., Inc., Minneapolis, Minn., a corporation of Delaware Application April 10, 1929, Serial No. 353,958

3 Claims. (Cl. 53—5)

Our invention relates to a portable apparatus in which the toasting or cooking of food articles is accomplished between two electrical heating elements, arranged in spaced relation within the apparatus.

The essential objects of the invention are; first, to provide an apparatus of the class described, comprising a heating and heat-retaining compartment or oven which will be adjustable in spatial volume and capacity, and in which a great variety of food articles such, for example, as sandwiches, bread, waffles, cake, bacon, eggs, meat, etc., may be toasted, baked, cooked, or otherwise prepared for the table; and, second, to provide such an apparatus having a plurality of electric heating elements horizontally disposed within the oven thereof, which are readily adjustable to and from each other, so as to apply the heat as closely and intensely as desired to articles of food requiring different heat treatment, because of their form, ingredients or moisture content, and whereby ventilation may be controlled so as to prevent the escape or retainment, as may be desired, of the cooking gases and flavors of different articles of food.

A further object is to provide a self contained portable toasting and cooking apparatus in which interchangeable toasting and cooking utensils may be either placed between the heating elements for use in cooking or in separate compartments for storage.

Still further objects are to provide an apparatus of the class described, which will be convenient of operation and quick of adjustment, and will be sanitary, simple of construction, and cheap to manufacture.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings;

Figure 1 is a front elevation of the apparatus embodying our invention, showing the heating compartment or oven closed;

Figure 2 is an end elevation of Figure 1;

Figure 3 is a vertical transverse section on the line 3—3 of Figure 1, illustrating the apparatus in position for toasting sandwiches;

Figure 4 is a similar section showing the oven fully extended as, for example, when arranged for broiling;

Figure 5 is a longitudinal sectional view on the line 5—5 of Figure 2;

Figure 6 is a horizontal sectional view on the line 6—6 of Figure 5;

Figure 7 is a detail sectional view on the line 7—7 of Figure 3, illustrating the electric starting and stopping switch mechanism;

Figure 8 is a detail view showing one of the utensils;

Figure 9 is a front elevation partially in section on the line 9—9 of Figure 10, showing an apparatus of modified form, adapted for greater capacity and efficiency;

Figure 10 is a vertical transverse section on the line 10—10 of Figure 9; and

Figure 11 is a horizontal detail sectional view on the line 11—11 of Figure 10.

In the drawings, 2 represents the base and stand of the apparatus provided with handles 3 by which it may conveniently be moved to any desired place. Erected upon the base 2, and fastened thereto by screws 4, is the lower stationary oven section comprising the side walls 5 and 6 and a rectangular frame 7 forming the front and rear wall of the oven, all rigidly connected together (see Figure 6). Within the frame 7 and fastened thereto by screws 9, is arranged a stationary heating element 8. The side walls 5 and 6 are provided with a series of ledges or inwardly projecting ribs 10, forming ledges or rails adapted to receive either a toasting or food-holding utensil 11, a heat reflecting plate or oven bottom 12, or the general cooking and preparing utensil 13.

A cover 14 is removably hinged to the rear of the utensil 13 by means of pins 15 (see Figure 8). A handle 16 is pivoted to the front wall of the utensil 13 by a pin 17 and is normally extended as shown in Figures 1, 2, and 3. This handle is retained in extended position by means of a threaded pin 18 having a thumb nut 19. A handle 20 is secured to the toasting utensil 11 and handles 21—21 are provided on the heat reflecting plate 12, and a similar handle 22 is provided upon the cover 14 by which the parts may conveniently be withdrawn and inserted in proper positions between the ledges 10. Grooves 23 are provided in the sides of the utensil 13 by means of which it may be inserted in a heat receiving position above the heating element 8 and grooves 5a and 6a are arranged in the side plates 5 and 6, respectively, in which may be inserted the bottom plate 12 and cover 14, as shown in Figure 4.

Above the heating elements 8 and fastened by screws 24 within a movable casing or oven section 25, is arranged a second heating element 26. The movable oven section 25 is provided with depending side plates 27 and 28, slidingly arranged between outwardly projecting ribs 29 on the side walls 5 and 6. The side plates 27 and 28 are U-shaped in horizontal cross-section, as shown in Figure 6, to form closed recesses 30 between said plates and the end walls 5 and 6. A shaft 31 is mounted in bearings 32 in said walls, and extends through the apparatus between the bottom plate 12 and the heating element 8. Crank arms 33 and 34 are rigidly secured to the shaft 31 within the closed recesses 30, and are pivotally connected by studs 35 to vertical links 36, upon which is supported the oven section 25 by means of headed pins 37 and nuts 38. Friction springs 39 are secured to the end walls 5 and 6, and, by exerting outward tension against the depending side plates 27 and 28 of the oven section 25, hold the oven section in any vertically adjusted position.

A handle 40, arranged in a convenient position for the operator, is rigidly fastened to the outer projecting end of the shaft 31, as shown in Figures 2 and 6. The shaft 31 projects through a slot 41 in the depending side plate 28 of the oven section 25, shown best in Figure 2. By means of the handle 40, the oven section 25 may be conveniently raised or lowered to any desired position, and will be retained in adjusted position by the friction springs 39.

The toasting utensil 11 preferably consists of a rectangular frame having an open grid composed of pins 42, upon which food articles to be toasted may be placed. The cooking utensil 13 forms a rectangular watertight receptacle, open at the top and adapted to be closed by the removable cover 14, when desired.

For sanitary considerations and ease of handling, we prefer to construct substantially the entire apparatus, except the heating elements, of aluminum. The heating elements 8 and 26 may be of any preferred type and construction, but we have shown them consisting of resistance coils 43 and 44 arranged in suitable rectangular frames 76. The ends of the lower coil 43 are connected to insulated terminals 45 and 46, and the ends of the upper coil 44 to similar terminals 47 and 48. Flexible connections 49 and 50 connect the terminals 45 and 46 with the terminals 47 and 48, respectively. The connections 49 and 50 allow for the movement of the upper terminals 47 and 48, to and from the lower stationary terminals 45 and 46, when the casing 24 is vertically adjusted. A cover 64 normally encloses the above described terminals and wires, and is removably secured to the oven casing 25 by screws 66.

Wires 52 and 53 are connected to the lower terminals 45 and 46, respectively, and extend downwardly and forwardly under the base 2, to insulated terminal contact pins 54 and 55, arranged and insulated in a base socket 56. (Figure 7). A casing 57, of insulating material, is adapted to be received in the socket 56 and is provided with spring contacts 58 and 59 adapted to receive and make electrical connection with the contact pins 54 and 55, respectively. Terminals 60 and 61, to which are connected line wires 62 and 63, are arranged in the casing 57, and a wire 65 connects the terminal 61 with the terminal 67 of the contacts 59. The terminal 68 of the contacts 58 is connected by a wire 66 to a terminal 70 of a switch connecting spring 72. A switch member 73 is pivoted at 74 to the casing 57, and is adapted to be moved into electrical contact with the switch terminal 60, to which the line wire 62 is connected. The switch member 73 is provided with a notch 77 into which normally, when the switch is open, a cam 78 projects. This cam is fastened to a spindle 79, having bearings in the casing 57 and being provided above the casing with a pointer 80 and an operating knob 81.

It will be seen that when the cam 78 is moved in the direction of the arrow in Figure 7, the switch member 73 will be brought into contact with the line wire terminal 60 and will be held in contact therewith by the connecting spring 72. The electrical circuit is thus closed and a current will flow from the line wire 62 through the switch connections and wire 52 to both the lower heating element 8 and upper heating element 26, through the resistance coils 43 and 44, and back through the wire 59 to the line wire 63. When the toasting or cooking is completed the cam arm 78 is returned to the normal position shown in Figure 7, breaking the electrical circuit.

While we have shown no means cooperating with the switch mechanism for automatically controlling the heat generated in the oven and timing the heating periods, as this feature forms no part of the present invention, it will be understood that such means may be installed in the casing 57, and while, for the sake of simplicity, we have illustrated and described an apparatus having only two interchangeable utensils for toasting and cooking, it is evident that an apparatus may be constructed having a greater number of heating elements and more interchangeable utensils and that various other modifications may be made in the details of construction without departing from the invention.

In the operation of the apparatus, the desired utensil is withdrawn from its normal place on the ledges 10 and supplied with the food article to be cooked or treated. The upper oven section is then quickly adjusted by means of the handle 40 to the position best adapted to the cooking of the article, and the utensil inserted between the upper heating element 8 and lower heating element 26. A ventilating space 82, variable by adjustment of the upper oven section 25 according to the nature and desired treatment of the food article, is usually maintained between the cooking utensil and the upper section. The switch cam 78 is then turned in the direction of the arrow in Figure 7, thereby closing the heating circuit and starting the apparatus. When the heating circuit is broken by the return of the switch cam, either manually or automatically, the apparatus will cease functioning. The cover 14 may be applied to any of the utensils to preserve the cooking fumes and flavors in the food, when required. If desired, the heat deflecting plate 12 normally forming the bottom of the oven, may be removed and the utensil placed on the lower ledges, as shown in Figure 5, whereby two or more food articles may be prepared at the same time.

In Figures 9 to 11, we have illustrated an apparatus of modified construction, having double the capacity of the apparatus heretofore shown and described. The apparatus here shown is adapted to receive a great variety of baking, toasting, broiling, and other cooking utensils, and occupies the same lateral space. It comprises two complete ovens arranged one above the other. Both ovens are adjustable by a single hand lever, whereby they may be adjusted for articles of varying bulk, and whereby they may also be positioned so that the heat absorption of the food articles will be most efficient.

The oven complete, as heretofore described, is elevated and its side walls 5 and 6 are extended downwardly to form recessed supports 82 and 83, which are secured to the main base member 84 by screws 85. In place of the receptacle 13, shown in Figures 1 to 6, and immediately below the stationary heating element 8, is arranged a second stationary heating element 86 which is enclosed by and secured to a rectangular frame 87, forming the walls of the lower oven by screws 87. The movable section of this oven is arranged below a stationary section 88, and a rectangular frame 89, composing its walls and containing the movable heating element 90, is secured by screws 91 to guide plates 92, slidably mounted in grooves 93 formed in the supports 82 and 83.

Above the heating element 90, the guide plates 92 are provided with a slideway 94, adapted to receive a toasting grid 95 or other culinary utensil. Immediately below the heating element 90, a heat insulating plate 96, forming the lower wall of the oven, is inserted in a groove 97 at the lower extremity of the guide plates 92. A second heat insulating plate 98, forming a dividing wall between the two ovens, is similarly arranged between the stationary heating elements of the two ovens.

The movable heating elements 26 and 90, and the oven sections in which they are enclosed, are shown to be adjustable simultaneously in opposite directions towards or away from their respective stationary heating elements 8 and 86, by means of a single hand lever 99, secured to a shaft 100 which is journaled at opposite ends of the base 84. While it is not shown in the drawings, it will be understood that the parts for adjusting the movable sections of the two ovens hereinafter described, are duplicated at the opposite end of the apparatus.

Referring to Figure 10, an oven 102 is fastened upon the shaft 100 and pivotally carries a vertical link 103 connected to a stud 104, which passes through a slot 105 in the end wall extension 83, and is secured to the movable guide plate 92. A link 106 has one end pivotally connected to the stud 104 and extends upwardly and has its other end pivotally connected at 107, to a double acting rocker arm 108, arranged to swing upon a projecting pivot 109 secured to the end wall 7 of the upper oven. The opposite end of the rocker arm 103 has pivotal connection at 110, with an upwardly extending link 111 pivoted upon a pin 112, secured to the end wall 28 of the movable section of the upper oven. The movable oven sections of the apparatus are shown in the drawings as closed against the stationary oven sections. When, however, the hand lever 99 is moved upwardly from the position shown by dotted lines in Figure 10, the lower movable oven section will be moved downwardly away from the stationary heating element 86, and the upper movable section will simultaneously be moved upwardly away from the stationary heating element 8, and both will be retained in the adjusted positions by the frictional resistance of the springs 113.

We prefer to provide two electric switch instruments 114 and 115 for this apparatus, whereby the starting and stopping operation of the heat application may be controlled independently for each oven as a unit. The mechanism and electrical connections for each oven unit may be substantially similar to that shown and described for the single oven unit, the switch instrument 114 controlling one oven and the instrument 115 controlling the other, as indicated in Figure 9. Insulated wires 116 and 117 connect the instrument 114 with the terminals 45 and 46 of the upper heating element 8, corresponding to the heating element 8 shown in Figures 1 to 6 of the drawings. Similar wires 118 and 119 connect the instrument 115 with the terminals 120 and 121 of the lower stationary heating element 86, and flexible connections 122 and 123 connect the terminals 120 and 121 with the terminals 124 and 125, respectively, of the lower movable heating element 90 allowing for its movement to and from the heating element 86.

We claim as our invention:

1. In a toasting and cooking apparatus, the combination of a stationary oven section having a heating element arranged therein, a movable oven section slidingly arranged upon said stationary oven section, a casing, a shaft mounted in said casing, crank arms secured to said shaft, links connecting said crank arms to said movable oven section, and a hand lever connected to said shaft for relatively adjusting said movable oven section with respect to said stationary oven section.

2. In an apparatus of the class described, a horizontally disposed fixed oven section, movable oven sections associated with said fixed section and adapted for vertical adjustment relatively thereto, said movable sections cooperating with said fixed section to provide toasting compartments, a shaft, crank arms thereon, links operatively connecting said crank arms with said movable oven sections and means for operating said shaft to cause said movable oven sections to be moved towards or away from said fixed oven section to vary the sizes of the toasting compartments.

3. In an apparatus of the class described, a casing, a horizontally disposed fixed oven section in said casing, movable oven sections associated with said fixed section and adapted for vertical adjustment relatively thereto, said movable sections cooperating with said fixed sections to provide toasting compartments, a shaft having crank arms thereon, rocker arms pivoted to the casing, links operatively connecting said rocker arms with said movable oven sections, and means operatively connecting said crank arms with said links whereby when said shaft is operated, said movable oven sections may be moved towards or away from said fixed oven section.

JULIUS C. WILKIE.
NATHAN R. T. McLEAN.